March 27, 1951  F. G. HOLMES  2,546,507
AUTOMATIC FREIGHT CAR
Filed March 24, 1948  2 Sheets-Sheet 1
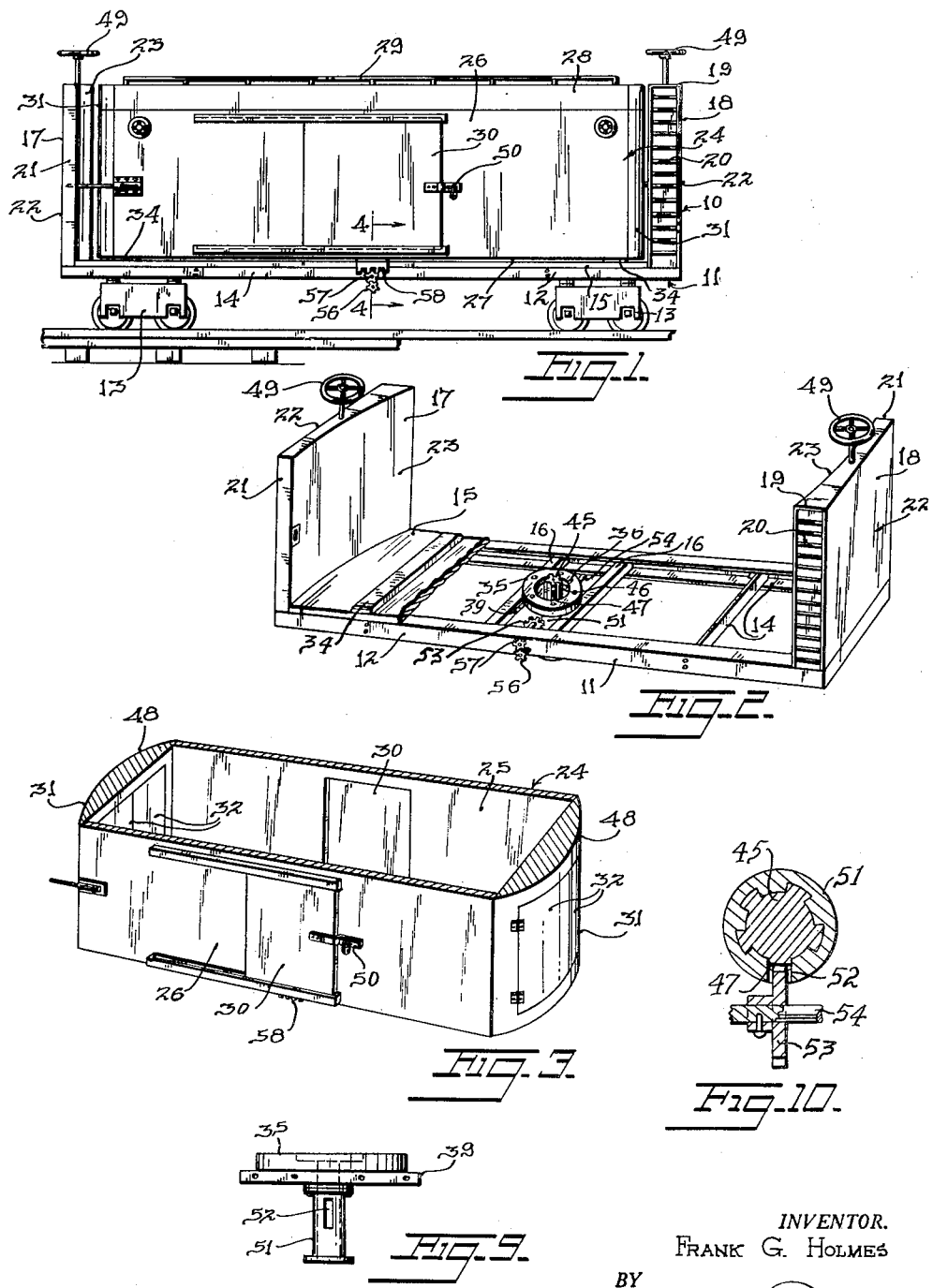
INVENTOR.
FRANK G. HOLMES
BY
ATTORNEY March 27, 1951          F. G. HOLMES          2,546,507
AUTOMATIC FREIGHT CAR
Filed March 24, 1948          2 Sheets-Sheet 2
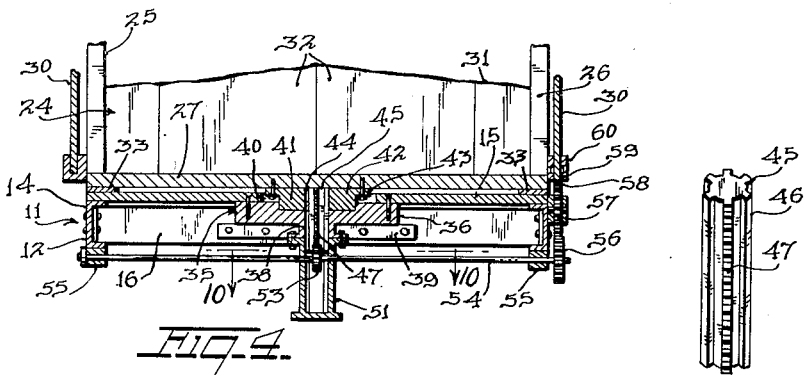
INVENTOR.
Frank G. Holmes
BY
*ATTORNEY*

Patented Mar. 27, 1951

2,546,507

UNITED STATES PATENT OFFICE 2,546,507

AUTOMATIC FREIGHT CAR

Frank G. Holmes, Philadelphia, Pa.

Application March 24, 1948, Serial No. 16,782

7 Claims. (Cl. 105—455)

This invention relates to a freight car, and more particularly to a freight car having a body which is rotatable relative to the chassis so that it can be turned into overlapping relation with the loading platform of a station to simplify the loading and unloading procedures.

An object of the present invention is to provide a freight car having a chassis provided with a center-pin center-plate turntable supporting a rotatable body which may be swung about the axis of the turntable to dispose one or either of its ends laterally of the railway track in a position overlapping a loading platform.

A further object is to provide a freight car as aforesaid having means for normally holding the chassis and body in longitudinally aligned relation, these means being actuated by movement of the side door of the freight car.

Another object is to provide a freight car as aforesaid in which the chassis is provided with end structures which fit closely to, but permit the rotation of, the body.

For further comprehension of the invention, and of the objects and advantages thereof, reference will be had to the following description and the accompanying drawing, and to the appended claims in which the various novel features of the invention are more particularly set forth.

In the accompanying drawing forming a material part of this disclosure:

Fig. 1 is a side elevation of a freight car constructed in accordance with this invention.

Fig. 2 is a perspective view of part of the freight car chassis.

Fig. 3 is a perspective view of part of the freight car rotatable body.

Fig. 4 is a fragmentary view in section on the line 4—4 of Fig. 1.

Fig. 5 is a plan view of the center pin.

Fig. 6 is a plan view of the center plate.

Fig. 7 is a perspective view of the locking pin.

Fig. 8 is a perspective view of the freight car showing the body rotated into overlapping position with a station platform.

Fig. 9 is a side view of the center plate casting.

Fig. 10 is an enlarged horizontal sectional view taken on the line 10—10 of Fig. 4.

The freight car, constructed in accordance with this invention, is indicated in the drawing generally by the reference numeral 10. It includes a chassis 11 consisting of a bed 12 spring-supported on the usual trucks 13. The bed is formed of longitudinal and transverse channel beams 14 covered with a floor 15. There may be any number of transverse beams, two of which will be at the center portion of the bed to receive the center plate construction to be later described. One of these transverse beams is shown in Fig. 4 and is indicated by the numeral 16.

The chassis further includes end members 17 and 18. They are substantially similar but oppositely disposed. Each member includes a wide side 19 carrying a ladder 20 and a narrow side 21. As viewed in Fig. 2, the side 19 of the left end member is at the front and the side 19 of the right end member is at the rear. The outer walls 22 of the end members are flat while the inner walls 23 are cylindrical about a common axis at the center of the bed 12.

The rotatable body 24 of the freight car is shown in Fig. 3 in section and in Fig. 8 in outside perspective. It is box-like in configuration, having the usual four sides, floor and roof. The side wall 25 and the side wall 26, the floor 27 and the roof 28 are much like the corresponding walls of a standard box car. A cat walk 29 is supported on the roof. Side doors 30 are formed in the side walls 25 and 26. The end walls 31 are, however, provided with hinged doors 32.

The body 24 is supported on the chassis floor 15, on a center pin-center plate construction and on side and end bearings. The side bearings 33 are merely wear plates secured to the top of the floor 15, as are the end bearings 34. If desired, similar and contacting wear plates can be connected to the bottom of the body, but generally it is believed that the bottom of the body will be strong enough and smooth enough to set directly on the wear plates 33 and 34.

The center pin-center plate construction includes a cast center plate 35, see Fig. 6, provided with a bolting flange 36, a cylindrical socket 37, a toothed orifice 38 at the axis of the socket, and depending straight bolting flanges 39 for bolting to the two transverse beams 16 at the center of the bed 12. The flange 36 is bolted to the under side of the floor 15 beneath an orifice 40 therein.

The center pin 41 is best shown in Fig. 5. It includes a central boss 42 disposed in socket 37 with a rotating working fit therein, the bottom of the center pin transmitting the weight of the body to the bottom wall of the socket 37. The boss is surrounded by a bolting flange 43 by means of which the center pin is bolted to the floor 27 of the rotatable body 24. A toothed orifice 44 similar to the orifice 38, is formed in the center pin 41 and disposed in line with the orifice 38 when the body 24 and the chassis 11 are in longitudinal alignment.

A locking pin 45, best shown in Fig. 7, locks the body and chassis in longitudinal alignment preventing the body from swinging unauthorizedly relative to the chassis about the axis of the center pin when the freight car is in transit. The pin has a toothed stem 46, one tooth of which has a rack 47.

When the freight car is in transit, the pin 45 is in place, as shown in Fig. 4, with its stem disposed in the orifices 38 and 44 and with its teeth coacting with the teeth of the orifices 38 and 44. The diameter of the locking pin 45 will be large enough to firmly lock the body 24 to the chassis 11.

When the freight car is at a loading platform, the pin 45 can be removed, leaving the body 24 free to be rotated relative to the chassis. To this end the outer end faces 48 of the body 24 are curved cylindrically about the axis of the center pin 41 and fit with working clearance between the end wall faces 23. Thus the end walls 17 and 18 form a partial cylinder and the freight car body forms a partial cylinder of slightly smaller diameter than the chassis cylinder and rotatable therein. When the locking pin 45 is removed, the body can be rotated so that one end thereof, or the other end thereof, depending on which side of the car the loading platform is, can be pulled into overlapping engagement with the loading platform, as shown in Fig. 8. The end doors 32 at the body end over the platform can then be opened and the car loaded or unloaded as desired. When the body 24 is parallel with the chassis 11, the end doors 32 are sealed by the end walls 17 and 18.

The usual brake mechanisms 49 for the hand brakes are carried by the end walls 17 and 18.

From the foregoing description it will be seen that a freight car is provided which will permit endwise loading and unloading, greatly increasing the capacity and utility of the freight car and simplifying loading operations. For example, in loading cars with automobiles, the automobiles can be run directly into the freight cars, eliminating the need of turning them after insertion as must be done when they are loaded through the side doors 30. The body 24 may be rotated relative to the chassis 11 by any desired means.

There must be, of course, some means of operating the locking pin 45. This means must be tamper-proof as it would be disastrous if the body were to swing when the freight car was in transit. It must also be excluded from the interior of the freight car since the interior will be loaded which load would conceal and possibly damage the mechanism were it within the freight car.

It is a usual practice to lock freight car doors and thus the doors 30 are provided with locks 50. These locks, and the doors themselves, are utilized to constitute locking pin actuating means, thereby eliminating the need of providing separate locks for the locking pins. The same is true even though seals are substituted for the locks 50.

The center plate 35 has a depending cylinder 51 bolted to the rest of the center plate in line with the locking pin 45, and the cylinder 51 is toothed to permit the pin 45 to slide therein but prohibiting it from rotating. The cylinder 51 has an opening 52, see Figs. 9 and 10, in line with the rack 47 of the pin 45. A gear 53 fits through the opening 52 and meshes with the rack 47 so that rotation of the gear in one direction will drop the pin, leaving the body free to be rotated relative to the chassis, whereas rotation of the gear in the opposite direction will raise the pin and lock the body and chassis.

The gear 53 is mounted on a cross shaft 54 supported in suitable bearings 55, depending from the chassis sills. At one end it carries a gear 56 which meshes with an idler gear 57 which meshes and unmeshes with a short depending rack 58 secured to the bottom of one freight car door 30 and extended through a slot 59 in the bottom guide 60 for the freight car door. The rack and gears are of suitable size so that when the door 30 is in closed position, the pin 45 is fully raised as shown in Fig. 4. The body and chassis are then locked, and when the doors 30 are locked, the locking pin is secured in a foolproof manner. When it is desired to unload the body and rotate it, the door 30 must be first unlocked and moved. When it has been moved sufficiently to move the pin 45 downward below the bottom of the boss 42, the end of the rack will have been reached, the gear 57 and rack 58 then parting. The rack is thus sufficiently short to permit rotation of the body.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a freight car having a chassis supported on spaced trucks and including a floor and opposite end walls rising from the floor and a rotatable body in the chassis including end walls containing doorways, a center pin-center plate construction for rotatably mounting the body on the chassis floor for rotation of the body whereby the body end walls can be disposed laterally of the chassis so that they overlap a loading platform to facilitate loading and unloading, said center pin-center plate construction having toothed central orifices vertically aligned, and a toothed pin movably disposed in the orifices for normally holding said body and chassis in longitudinal parallelism.

2. In a freight car having a chassis supported on spaced trucks and including a floor formed with a central orifice and opposite end walls rising from the floor and a rotatable body in the chassis including end walls containing hinged doors and a floor, a center pin-center plate construction at the floor orifice for rotatably mounting the body on the chassis floor for rotation of the body whereby the body end walls can be disposed laterally of the chassis so that they can overlap a loading platform to facilitate loading and unloading, said center pin-center plate construction including a center pin fastened to the under side of the body floor, a center plate secured to the under side of said chassis floor over the central orifice thereof, said center pin and said center plate having aligned toothed orifices at said axis, and a toothed pin disposed movably in said toothed orifices for normally locking the body against rotation relative to the chassis.

3. In a freight car having a chassis and a body including a movable side door, a center pin-center plate construction for rotatably mounting the body on the chassis including a center pin secured to the body, a center plate secured to the chassis and receiving said center pin, said center plate and center pin having aligned toothed orifices, said center plate having a depending well below its said orifice, a toothed locking pin disposed in said orifices and being adapted to be lowered into said well to free said center pin, one of the teeth of said locking pin carrying a rack, said well having an opening in line with said rack, and apparatus for lowering said locking pin including a gear in said opening meshing with said rack, and mechanism connecting said gear with the movable side door whereupon when the door is moved said gear is rotated to drop said locking pin.

4. In a freight car having a chassis and a body including a movable side door, a center pin-center plate construction for rotatably mounting the body on the chassis including a center pin secured to the body, a center plate secured to the chassis and receiving said center pin, said center plate and center pin having aligned toothed orifices, said center plate having a depending well below its said orifice, a toothed locking pin disposed in said orifices and being adapted to be lowered into said well to free said center pin, one of the teeth of said locking pin carrying a rack, said well having an opening in line with said rack, and apparatus for lowering said locking pin including a gear in said opening meshing with said rack, mechanism connecting said gear with the movable side door whereupon when the door is moved said gear is rotated to drop said locking pin, said mechanism including a rack depending from the movable door, a shaft supporting said gear, and gearing between said rack and said shaft.

5. In a freight car having a chassis and a body including a movable side door, a center pin-center plate construction for rotatably mounting the body on the chassis including a center pin secured to the body, a center plate secured to the chassis and receiving said center pin, said center plate and center pin having aligned toothed orifices, said center plate having a depending well below its said orifice, a toothed locking pin disposed in said orifices and being adapted to be lowered into said well to free said center pin, one of the teeth of said locking pin carrying a rack, said well having an opening in line with said rack, and apparatus for lowering said locking pin including a gear in said opening meshing with said rack, mechanism connecting said gear with the movable side door whereupon when said door is moved the gear is rotated to drop said locking pin, said mechanism including a rack depending from the movable door, a shaft supporting said gear, and gearing between said rack and said shaft, said rack of the movable door being short enough to leave said gearing when said locking pin has left said center pin.

6. In a freight car having a chassis formed with spaced laterally extending beams intermediate the ends thereof and a car body disposed over the chassis and formed with a slidable side door, means rotatively supporting the car body on the chassis, comprising a center plate mounted between the sides of the beams midway between the sides of the chassis and formed with a concentric cylindrical socket and a concentric vertically splined orifice, a center pin secured to the bottom of the car body and formed with a vertically splined orifice, a concentric boss formed on the bottom of said center pin and rotatively disposed in the socket of said center plate permitting the car body to be concentrically rotated relative to the chassis, said splined orifices having their splines arranged to be in vertical alignment when the car body is in longitudinal alignment over the chassis, a vertically splined locking pin slidably disposed in said splined orifices retaining said center pin against rotation relative to said center plate to retain the car body in longitudinal alignment with the chassis, a vertically splined well secured to the bottom face of said center plate in axial alignment with the vertically splined orifice of said center plate and into which said locking pin is to be lowered to free said center pin for rotative movement relative to said center plate, and means controlled by sliding movement of the side door to lower said locking pin into said well.

7. In a freight car having a chassis formed with spaced laterally extending beams intermediate the ends thereof and a car body disposed over the chassis and formed with a slidable side door, means rotatively supporting the car body on the chassis, comprising a center plate mounted between the sides of the beams midway between the sides of the chassis and formed with a concentric cylindrical socket and a concentric vertically splined orifice, a center pin secured to the bottom of the car body and formed with a vertically splined orifice, a concentric boss formed on the bottom of said center pin and rotatively disposed in the socket of said center plate permitting the car body to be concentrically rotated relative to the chassis, said splined orifices having their splines arranged to be in vertical alignment when the car body is in longitudinal alignment over the chassis, a vertically splined locking pin slidably disposed in said splined orifices retaining said center pin against rotation relative to said center plate to retain the car body in longitudinal alignment with the chassis, a vertically splined well secured to the bottom face of said center plate in axial alignment with the vertically splined orifice of said center plate and into which said locking pin is to be lowered to free said center pin for rotative movement relative to said center plate, and means controlled by sliding movement of the side door to lower said locking pin into said well, said means comprising rack teeth formed on one of the splines of said locking pin, said well being formed with an opening aligned with said rack teeth, a shaft rotatively supported to extend along the side of said well formed with said opening, a gear on said shaft extending through said opening and meshing with said teeth, and gearing interposed between said shaft and the slidable door to turn said shaft and gear in a direction to lower and raise said locking pin as the door is moved in one direction or the other.

FRANK G. HOLMES.

REFERENCES CITED

The following references are of record in the file of this patent:

UNITED STATES PATENTS

| Number | Name | Date |
|---|---|---|
| 460,342 | McVickar | Sept. 29, 1891 |
| 1,166,702 | Mardon et al. | Jan. 4, 1916 |
| 1,537,162 | Fowler | May 12, 1925 |
| 2,400,738 | Brown | May 21, 1946 |

FOREIGN PATENTS

| Number | Country | Date |
|---|---|---|
| 57,434 | Switzerland | Apr. 27, 1911 |
| 311,434 | Great Britain | May 23, 1929 |